(12) United States Patent
Brady

(10) Patent No.: US 11,808,205 B2
(45) Date of Patent: Nov. 7, 2023

(54) TURBINE INLET AIR COOLING SYSTEMS WITH CONDENSATE WATER RECOVERY

(71) Applicant: Stellar Energy Americas, Inc., Jacksonville, FL (US)

(72) Inventor: Thomas Brady, Oak Brook, IL (US)

(73) Assignee: STELLAR ENERGY AMERICAS, INC., Jacksonville, FL (US)

( * ) Notice: Subject to any disclaimer, the term of this patent is extended or adjusted under 35 U.S.C. 154(b) by 0 days.

(21) Appl. No.: 17/678,717

(22) Filed: Feb. 23, 2022

(65) Prior Publication Data
US 2022/0268204 A1 Aug. 25, 2022

Related U.S. Application Data

(60) Provisional application No. 63/152,699, filed on Feb. 23, 2021.

(51) Int. Cl.
*F02C 3/30* (2006.01)
*F02C 7/143* (2006.01)

(52) U.S. Cl.
CPC ............ *F02C 3/305* (2013.01); *F02C 7/1435* (2013.01); *F02C 7/143* (2013.01)

(58) Field of Classification Search
CPC ......... F02C 3/305; F02C 7/143; F02C 7/1435
See application file for complete search history.

(56) References Cited

U.S. PATENT DOCUMENTS

| | | | |
|---|---|---|---|
| 5,203,161 A | 4/1993 | Lehto | |
| 5,321,944 A | 6/1994 | Bronicki et al. | |
| 5,390,505 A * | 2/1995 | Smith | F28D 7/0066 62/90 |
| 5,809,981 A * | 9/1998 | Berg-Sonne | F02B 29/0443 123/563 |
| 6,216,443 B1 * | 4/2001 | Utamura | F01K 21/047 60/39.092 |
| 6,516,603 B1 * | 2/2003 | Urbach | F02C 9/22 60/39.53 |
| 6,837,056 B2 | 1/2005 | Potnis et al. | |
| 6,938,405 B2 | 9/2005 | Carberg et al. | |
| 7,028,485 B1 * | 4/2006 | Mee | F04D 29/705 60/39.53 |

(Continued)

FOREIGN PATENT DOCUMENTS

| AU | 2020200018 A1 | 5/2022 |
|---|---|---|
| WO | 2004/025102 A1 | 3/2004 |

OTHER PUBLICATIONS

Sanjeev Jolly, P.E., (Dec. 2002). "Wet Compression—A Powerful Means of Enhancing Combustion Turbine Capacity," presented at Power-Gen International; 11 pages.

(Continued)

*Primary Examiner* — William H Rodriguez
(74) *Attorney, Agent, or Firm* — Michele V. Frank; Venable LLP

(57) ABSTRACT

A method and system for enhancing power generated by a gas turbine system. The system may include a turbine inlet cooling system and a wet compression air fogging system. Air entering the gas turbine system is cooled by the turbine inlet cooling system and the wet compression air fogging system. The wet compression air fogging system may increase the mass flow rate of the air entering the gas turbine system at the compressor.

23 Claims, 2 Drawing Sheets

(56) References Cited

U.S. PATENT DOCUMENTS

| | | | | |
|---|---|---|---|---|
| 7,065,953 B1* | 6/2006 | Kopko | ............... | F02C 7/1435 |
| | | | | 60/726 |
| 7,520,137 B2* | 4/2009 | Hoffmann | ............ | F02C 7/1435 |
| | | | | 60/39.3 |
| 7,784,286 B2 | 8/2010 | Bolis et al. | | |
| 8,220,784 B2 | 7/2012 | Nikolin et al. | | |
| 8,286,431 B2 | 10/2012 | Briesch et al. | | |
| 8,354,030 B1 | 1/2013 | Schuh | | |
| 8,534,039 B1* | 9/2013 | Pierson | ............... | F01K 25/106 |
| | | | | 60/39.182 |
| 9,057,288 B2 | 6/2015 | Pierson et al. | | |
| 9,441,542 B2 | 9/2016 | Zhang et al. | | |
| 9,803,549 B2* | 10/2017 | Doebbeling | ............ | F02C 7/057 |
| 9,850,816 B2 | 12/2017 | Zhang et al. | | |
| 2002/0056994 A1 | 5/2002 | Irish | | |
| 2002/0083712 A1* | 7/2002 | Tomlinson | ............ | F01D 17/085 |
| | | | | 60/775 |
| 2002/0134087 A1* | 9/2002 | Urch | ............... | F24F 3/147 |
| | | | | 62/271 |
| 2004/0105755 A1* | 6/2004 | Bolis | ............... | F02C 3/30 |
| | | | | 415/119 |
| 2007/0059159 A1* | 3/2007 | Hjerpe | ............... | B08B 9/00 |
| | | | | 415/117 |
| 2007/0240400 A1* | 10/2007 | Smith | ............... | F01K 23/101 |
| | | | | 60/39.182 |
| 2011/0052377 A1* | 3/2011 | Chamoto | ............... | F02C 7/04 |
| | | | | 415/180 |
| 2012/0011865 A1 | 1/2012 | Ivison | | |
| 2012/0216546 A1* | 8/2012 | Doebbeling | ............ | F01D 25/32 |
| | | | | 60/772 |
| 2013/0061597 A1* | 3/2013 | Chillar | ............... | F02C 7/04 |
| | | | | 60/39.181 |
| 2013/0067922 A1* | 3/2013 | Zhang | ............... | B05B 17/0615 |
| | | | | 60/39.53 |
| 2013/0283796 A1 | 10/2013 | Littleford | | |
| 2014/0178176 A1* | 6/2014 | Takahashi | ............... | F01D 11/24 |
| | | | | 415/117 |
| 2014/0290253 A1* | 10/2014 | Fujii | ............... | F02C 7/143 |
| | | | | 60/728 |
| 2014/0290910 A1* | 10/2014 | Fujii | ............... | F02C 7/143 |
| | | | | 165/96 |
| 2014/0290911 A1* | 10/2014 | Fujii | ............... | F02C 7/143 |
| | | | | 165/104.14 |
| 2016/0102613 A1* | 4/2016 | Brady | ............... | F25B 41/24 |
| | | | | 60/772 |

OTHER PUBLICATIONS

Punwani, D. (Dec. 2009). "Hybrid and LNG Systems for Turbine Inlet Cooling," presented at Power-Gen International; 21 pages.

Punwani, D.V., (Jun. 2011). "Combustion Turbine Inlet Cooling (CTIC) for Power Augmentation An Overview," presented at ASME Turbo Expo; 26 pages.

Ritcher T., (Jun. 2011). "Chiller Systems for Combustion Inlet Air Cooling," presented at ASME Turbo Expo; 22 pages.

Mee Industries Inc., (2015). "Gas Turbine Inlet Air Cooling & Wet Compression," 9 pages.

Global Data (Feb. 2012). "General Electric Company (GE)—Power—Deals and Alliances Profile," located at ,www.globalcompanyintelligence.com>; 407 pages.

International Search Report and Written Opinion dated May 23, 2022, directed to International Application No. PCT/US2022/017481; 7 pages.

\* cited by examiner

TURBINE INLET AIR COOLING SYSTEMS WITH CONDENSATE WATER RECOVERY

CROSS REFERENCE TO RELATED APPLICATIONS

This application claims priority to U.S. Provisional Application No. 63/152,699 filed Feb. 23, 2021, the entire contents of which are hereby incorporated by reference in its entirety.

TECHNICAL FIELD

The present application relates to electric power generation. More specifically, the present application relates to a combination of ambient air chilling with wet compression air fogging, and adiabatic pad air cooling.

BACKGROUND

The use of water and air chilling systems to cool the ambient air at the inlet to gas combustion turbine generators is known. Doing so typically allows for the output of those gas turbines to be increased whenever the ambient air temperature is higher than the temperature of the air that can be produced by the chilling systems. The use of water and air chilling systems may also increase the efficiency of fuel usage.

The use of compressing water for release as a wet fog through nozzles at the compressor on a gas turbine is known. Doing so typically allows for cooling of the air in the compressor which in turn allows the output of the gas turbines to be increased, the density of the air to be increased and the efficiency of fuel usage to be improved.

The use of water or air to reject heat from steam condensers that serve steam turbine drive electric generators in combined cycle power generation is known. Doing so typically allows the waste heat from gas turbines to be used to increase electric power generation.

The use of water or air to reject heat from water chilling systems that cool the ambient air at the inlet to gas combustion turbine generators is known. Doing so typically allows for the output of those gas turbines to be increased and the efficiency of fuel usage to be improved whenever the ambient air temperature is higher than the temperature of the air that can be produced by the chilling systems.

Current practices have deficiencies in regards to energy efficiency or maximization of output when operating at either full design or reduced air cooling loads, and/or flexibility of operation to reclaim and effectively use water that is condensed from the air in an air chilling system. Thus, a need exists for an improved system for cooling air to increase the output of a gas turbine.

SUMMARY

According to an embodiment, a system for enhancing power generated by a gas turbine system may include a turbine inlet cooling system; and a wet compression air fogging system, wherein air entering the gas turbine system is cooled by the turbine inlet cooling system and the wet compression air fogging system, and wherein the wet compression air fogging system increases a moist air mass flow rate entering the gas turbine system.

According to an embodiment, the system further includes a condensate recovery system.

According to an embodiment, the condensate recovery system includes a drain pan configured to collect condensate water from the turbine inlet cooling system; a storage tank configured to store the collected condensate water; and a flow control device configured to supply condensate water from the storage tank to the wet compression air fogging system.

According to an embodiment, the storage tank and one or more pipes in the condensate recovery system are non-metallic.

According to an embodiment, the condensate water is demineralized water.

According to an embodiment, the system includes a pump configured to move the condensate water from the storage tank, through the flow control device, and into a storage tank of the wet compression air fogging system.

According to an embodiment, the flow control device is a valve.

According to an embodiment, the system includes a second flow control device, the second flow control device configured to supply the condensate water to an external system.

According to an embodiment, the external system is a cooling tower of the turbine inlet cooling system.

According to an embodiment, the gas turbine system includes a compressor, a combustor, and a gas turbine.

According to an embodiment, the wet compression air fogging system injects water into the compressor where the water is vaporized to increase the mass flow rate through the compressor.

According to an embodiment, the water is demineralized water collected from the turbine inlet cooling system in a condensate recovery system.

According to an embodiment, a method for enhancing power generated by a gas turbine system may include cooling air with an inlet air chilling system; cooling air with a wet compression air fogging system; adding mass flow to the air flowing through a gas turbine system with the wet compression air fogging system, and supplying the cooled air from the inlet air chilling system and the wet compression air fogging system to the gas turbine system.

According to an embodiment, the cooled air is supplied to an inlet of a compressor of the gas turbine system and wherein the mass flow is added to the air flowing through the compressor.

According to an embodiment, the method includes collecting water from the inlet air chilling system in a condensate recovery system; supplying the water from the condensate recovery system to the wet compression air fogging system; and adding, with the wet compression air fogging system, mass to the air flowing through the compressor from the air flowing from an outlet of the inlet air chilling system.

According to an embodiment, collecting water includes collecting condensate water from a component of the air inlet chilling system.

According to an embodiment, the condensate water collects in a drain pan of the condensate recovery system.

According to an embodiment, the condensate water is provided to adiabatic pads in an air cooled heat rejection device.

According to an embodiment, supplying the water to the wet compression air fogging system includes opening a flow control valve in the condensate recovery system and pumping the water from a first storage tank in the condensate recover system to a second storage tank in the wet compression air fogging system.

According to an embodiment, the method includes sensing a dew point of the air.

According to an embodiment, the method includes sensing the dew point is rising and opening a flow control device in the condensate recover system based on sensing the dew point of the air is rising, the flow control device supplying condensate water to an external system.

According to an embodiment, the external system is a cooling tower of the inlet air chilling system.

According to an embodiment, the method includes sensing the dew point is below a predetermined threshold and lowering a set point temperature of the air flow from the outlet of the inlet air chilling system.

BRIEF DESCRIPTION OF THE DRAWINGS

Features and advantages of the invention will be apparent from the following drawings, wherein like reference numbers generally indicate identical, functionally similar, and/or structurally similar elements.

DETAILED DESCRIPTION OF THE DRAWINGS

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention. All references cited herein are incorporated by reference as if each had been individually incorporated.

Figure 1:
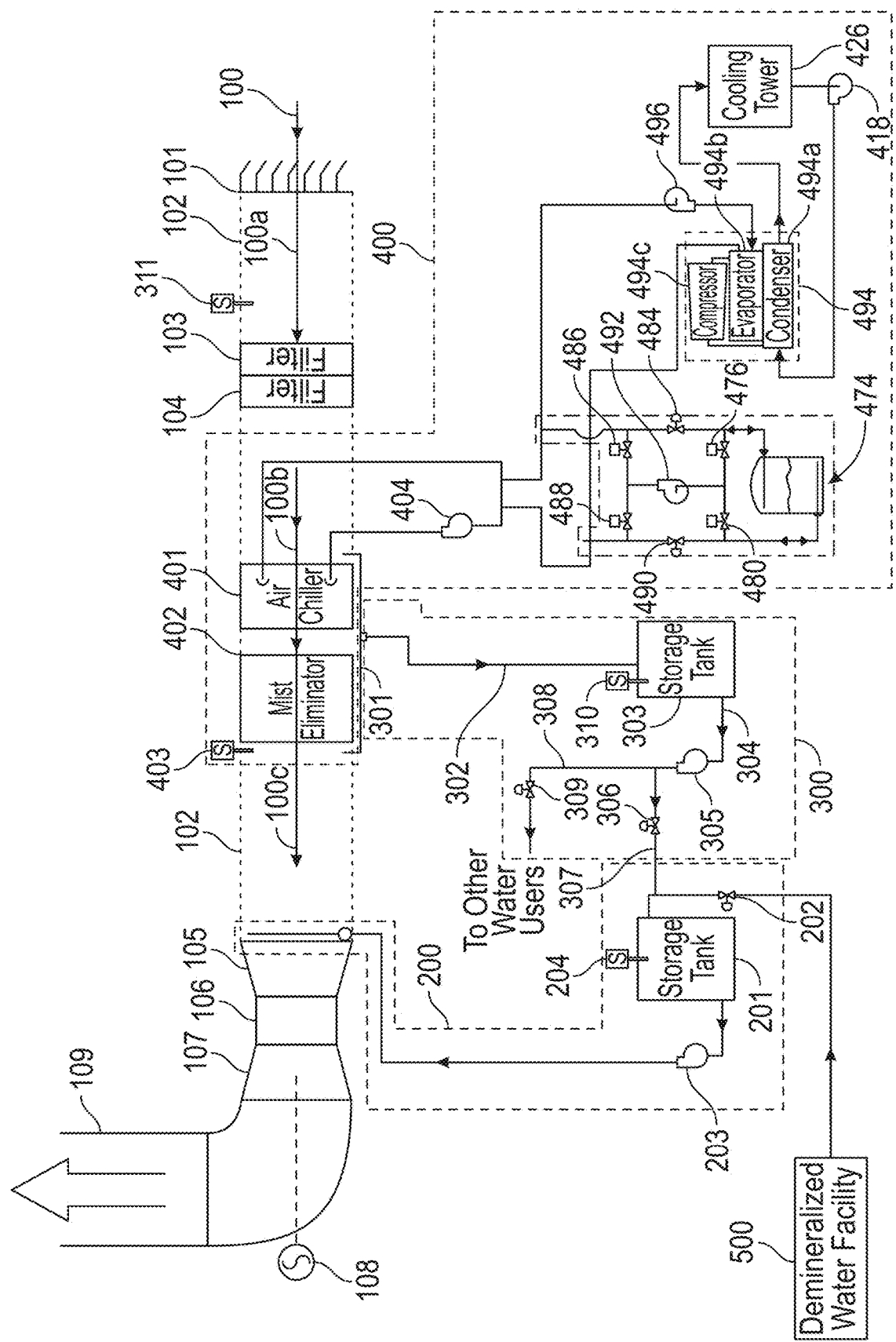
FIG. 1 is a schematic that shows an illustrative embodiment of ambient air chilling combined with a wet compression fogging system at the air inlet to a gas turbine, that also includes a condensed water recovery and delivery to serve as a replacement for or supplement to the demineralized water make up source for the wet compression fogging system.

FIG. 1 depicts a method and apparatus for chilling the ambient air 100 that is drawn through the air inlet of a gas combustion turbine generator. The ambient air 100 can be drawn through an inlet air louver 101 and air housing 102 into an air compressor 105, combustion chamber 106 and gas turbine 107 that is used to drive an electric power generator 108. As the ambient air 100 is drawn through the air housing 102, the ambient air 100 can be filtered through pre and high efficiency filters 103 and 104 in order to protect the mechanical operation of the compressor 105 and gas turbine 107. A well-known characteristic of a gas turbine 107 is that as the temperature of the ambient air 100 increases thereby reducing its density, the output energy delivered to the generator 108 is reduced. In order to compensate for the effects of increases to the ambient air 100, an inlet air chilling system 400 and a wet compression air fogging system 200 can be included in the air housing 102. The inlet air chilling system 400 may be a known system, such as, for example, the system described in U.S. Patent Application Publication No. 2016/0102613, herein incorporated by reference. The wet compression air fogging system 200 may be a known system, such as, for example, the system described in U.S. Pat. No. 7,784,286, herein incorporated by reference. The present disclosure combines the capabilities of known technologies shown at 400 and 200 in FIG. 1. Embodiments additionally utilize the demineralized water that is produced by inlet air chilling system 400 to support or completely replace the demineralized water that is required for wet compression air fogging system 200.

The inlet air chilling system 400 includes a cooling tower 426, a pump 418, a thermal storage tank 474, and a water chiller unit 494. The inlet air chilling system 400 includes flow control valves 476, 480, 490, 488, 486, and 484. The inlet air chilling system 400 includes a pump 492 and a pump 496. The water chiller unit 494 includes a condenser 494a, an evaporator 494b, and a compressor 494c. The operation of the aforementioned components of the inlet air chilling system 400 are known and are described in U.S. Patent Application Publication No. 2016/0102613.

In the inlet air chilling system 400, the air chiller 401 can chill or cool the ambient inlet air 100b as the air flows through the air chiller 401. The air chiller 401 can include a cooling coil through which the chilled liquid can circulate. As the inlet air 100b flows through the air chiller 401, the chilled liquid circulating in the cooling coil can chill the inlet air 100b to a chilled air 100c that enters the inlet of compressor 105. During the chilling, water can be condensed on the air chiller 401.

As the dew point of the ambient air 100 increases, the cooling load required from 400 increases and the amount of water that is condensed from the inlet air 100b at air chiller 401 also increases. In this embodiment, the demineralized water that is condensed on the air chiller 401 and the moisture/mist eliminator 402 collects in the drain pan 301 and flows through non-metallic piping 302 to one or more non-metallic water storage tanks 303. From the water storage tank 303 the demineralized water is drawn, on demand of the wet compression air fogging system 200 controls, through non-metallic piping 304 to one or more make-up pumps 305 and then through a flow control device 306 and non-metallic piping 307 on to one or more wet compression air fogging system storage tanks 201 to be used by and in the system 200.

Wet compression air fogging systems such as 200 shown in FIG. 1 can be limited in the amount of demineralized water that the system can provide into a compressor 105 and, therefore, in the amount of added electric power that the gas turbine 107 can provide as a result of wet compression air fogging operation. Inlet air chilling systems such as 400 shown in FIG. 1 can chill the inlet air 100b cold enough such that the gas turbine 107 will add substantially more power when compared to wet compression air fogging 200 in FIG. 1.

In known operation of inlet air chilling systems such as 400 in FIG. 1, the temperature of the air 100c that enters compressor 105 is controlled by the inlet air chilling system 400 which operates to maintain the set point for sensor 403. In the known operation of wet compression air fogging systems such as 200 in FIG. 1, the integral automation system of the system 200 controls the demineralized water flow rate from pump 203 to the inlet of compressor 105 to be within limits set by the compressor manufacturer. In these cases, the demineralized water can be provided by an independent source such as 500 in FIG. 1. The power output that is added by the two systems 400 and 200 is cumulative.

In the wet compression air fogging system 200, air may be cooled when entering the inlet of the compressor 105. Additionally, the wet compression air fogging system 200 may add to the moist air mass flow rate entering the compressor 105. The increase in moist air mass flow rate entering the turbine occurs within the compressor 105 section. Accordingly, as unclean water may damage the compressor blades, it is important to have extremely clean and/or demineralized water available for injecting (e.g. via the wet compression air fogging system 200) into the compressor 105. The wet compression air fogging system 200 may provide water droplets into the compressor 105. These water droplets evaporate through the compression process and thus add mass to the air flow through the compressor 105. The wet compression air fogging system 200 may have a cooling effect on the air. The wet compression air fogging system 200 may vaporize the moisture in the water (e.g., the demineralized water from the condensate recovery system 300), thus adding to the air mass flow of the air stream within the compressor 105. That is, water is injected into the compressor 105 and then evaporated, providing an increase in the mass flow rate through the compressor 105. This provides a majority of the mass flow increase.

In this embodiment, whenever the dew point air temperature at sensor 311 is above the inlet air temperature controlled by sensor 403, water will be condensed on the air chiller 401 and mist eliminator 402 surfaces, respectively, and will accumulate in the drain pan 301 and then into non-metallic storage tank 303. When the condensate recovery system 300 automation system senses that make-up water for the wet compression air fogging system 200 is available through level sensor 310, a flow control valve 202 will close and the flow control valve 306 will open. Make-up water pump 305 will activate to maintain the level in wet compression air fogging system storage tank or tanks 201 as controlled through tank level sensor 204. Operation of the wet compression air fogging system 200 will remain the same as previously described.

In some embodiments, when the dew point of the ambient air 100a as monitored at sensor 311 rises, more demineralized water can be created than can be used by the wet compression air fogging system 200. In this case, the condensate recovery system 300 automation system can open flow control valve 309 in order to allow condensate water to flow through non-metallic piping 308 to be used by other apparatuses, such as cooling towers that may be part of inlet air chilling system 400.

In some embodiments, when the dew point of the ambient air 100a as monitored at sensor 311 is lowered such that there is not sufficient condensate water to supply the wet compression air fogging system 200, the compressor 105 inlet air temperature set point at 403 can be lowered to create additional condensate water.

Accordingly, the present disclosure combines the technical field of ambient air chilling with the technical field of wet compression air fogging, at the inlet of gas combustion turbine generators. The disclosed system can reclaim demineralized water from the air cooling process for use in the wet compression air fogging process. The method and apparatus for reclaiming condensate waste water of the present disclosure allows for power enhancement at gas combustion turbine generators.

Embodiments of the present invention provide demineralized water that has been reclaimed from the ambient air chilling process for reinjection to a turbine inlet air stream through a wet compression air fogging process. Both technologies, ambient air chilling and wet compression air fogging at the inlet to turbines are known to be employed independently. The present disclosure combines the use of both technologies to improve the effects upon the turbine and at the same time provide demineralized water that is needed for best performance of the wet compression air fogging apparatus, thus conserving on fresh water consumption. The water will fall through the air chilling device into a collection pan that is immediately under the air chilling device. The water will then flow by gravity from the collection pan or pans to one or more condensate storage tanks where it will then be pumped on demand to the wet compression air fogging system, and as available, to other systems that require make-up water for their operation.

The condensate recovery system 300, may collect condensate water for use in external or additional systems. As described, the condensate recover system 300 may collect condensate water for use in the wet compression air fogging system 200. The condensate recovery system 300 may collect condensate water for alternative or additional uses. The condensate recovery system 300 may collect condensate water to be used in an alternate use than the wet compression air fogging system 200 when the benefit in the alternate use is greater for the power production process than its use in the wet compression air fogging system 200.

Figure 2:
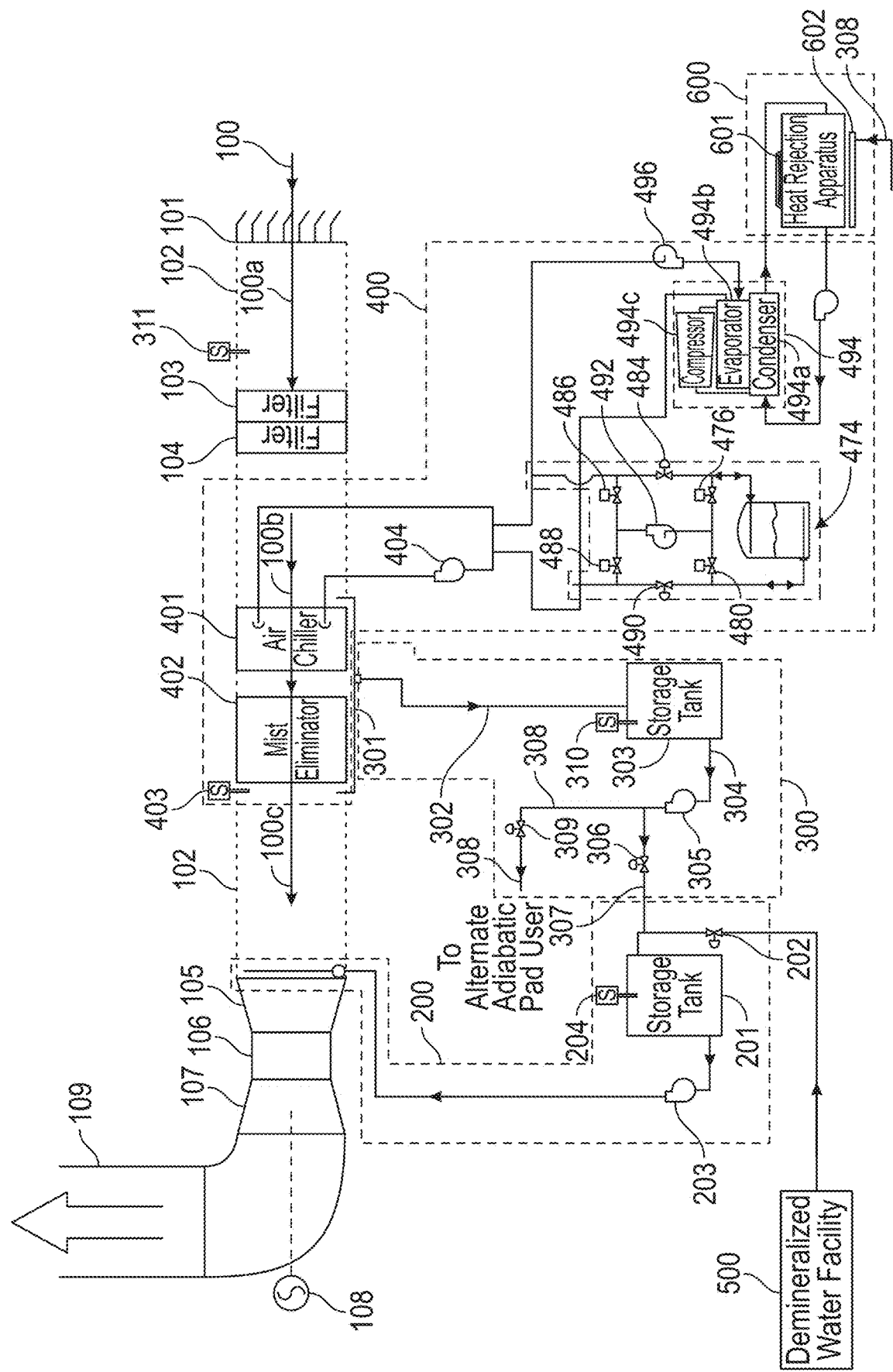
FIG. 2 is a schematic that shows the same illustrative embodiment described for FIG. 1 plus a condensed water system to pre-cool air that enters air cooled heat exchangers.

For example, an alternate embodiment of the present invention that is illustrated in FIG. 2 provides condensed, demineralized water from the condensate recovery system 300 to both the wet compression air fogging system 200 and to an air cooled heat rejection system 600. The condensate recovery system 300 may provide condensed, demineralized water to the air cooled heat rejection system 600 through a flow control valve 309 and pipe(s) 308. The condensed water is supplied to adiabatic cooling pads 602 that are positioned across an air inlet to an air cooled heat rejection apparatus 601. The condensed water fully evaporates as it flows through the adiabatic pads 602 and in doing so removes heat from the air that enters the air cooled heat rejection apparatus 601. This may allow the operation of the systems that is served to be more efficient. For example, in an electric power producing facility the air cooled heat rejection apparatus 601 may serve as steam condensers for combined cycle power generating systems and fluid coolers for gas turbine inlet air chilling systems. The air cooled heat rejection apparatus 601 may include air cooled heat exchangers that serve as steam condensers in a steam turbine electric power generating system. Alternatively, or additionally, the air cooled heat rejection apparatus 601 may serve as a fluid cooler to reject heat from a gas turbine inlet air chilling system. In either application, the air pre-cooling may make the operation of the air cooled heat exchanger more efficient.

According to embodiments, condensed, demineralized water from one or more inlet air chilling devices can be drawn into the condensate storage tank from where the water will be redistributed to the individual wet compression fogging systems or to adiabatic cooling systems.

The inlet cooling system of the present disclosure allows waste condensate water to be collected and used as make-up water to a wet compression air fogging system for increasing the mass flow rate of the air entering the gas turbine. In addition, the waste condensate may be used in adiabatic cooling pads at heat rejection equipment to increase the efficiency of the inlet cooling system.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A system for enhancing power generated by a gas turbine system, the system comprising:
an inlet air chilling system; and
a wet compression air fogging system downstream of the inlet air chilling system,
wherein air entering the gas turbine system is cooled by the inlet air chilling system and the wet compression air fogging system, and
wherein the wet compression air fogging system increases a moist air mass flow rate entering the gas turbine system, and
wherein a condensate water from the inlet air chilling system is provided to the wet compression air fogging system.

2. The system of claim 1 further comprising a condensate recovery system.

3. The system of claim 2, wherein the condensate recovery system comprises:
a drain pan configured to collect the condensate water from the inlet air chilling system;
a storage tank configured to store the collected condensate water; and
a flow control device configured to supply the condensate water from the storage tank to the wet compression air fogging system.

4. The system of claim 3, wherein the storage tank and one or more pipes in the condensate recovery system are non-metallic.

5. The system of claim 3, wherein the condensate water is demineralized water.

6. The system of claim 3, further comprising a pump configured to move the condensate water from the storage tank configured to store the collected condensate water, through the flow control device, and into a storage tank of the wet compression air fogging system.

7. The system of claim 3, wherein the flow control device is a valve.

8. The system of claim 3, further comprising a second flow control device, the second flow control device configured to supply the condensate water to an external system.

9. The system of claim 8, wherein the external system is a cooling tower of the inlet air chilling system.

10. The system of claim 1, wherein the gas turbine system includes a compressor, a combustor, and a gas turbine.

11. The system of claim 10, wherein the wet compression air fogging system injects water into the compressor where the water is vaporized to increase a mass flow rate through the compressor.

12. The system of claim 11, wherein the water is demineralized water collected from the inlet air chilling system in a condensate recovery system.

13. A method for enhancing power generated by a gas turbine system, the method comprising:
cooling air with an inlet air chilling system;
cooling air from the inlet air chilling system with a wet compression air fogging system;
increasing moist air mass flow to the air flowing through the gas turbine system with the wet compression air fogging system;
supplying the cooled air from the inlet air chilling system and the wet compression air fogging system to the gas turbine system;
collecting condensate water from the inlet air chilling system; and
supplying the condensate water to the wet compression air fogging system.

14. The method of claim 13, wherein the cooled air is supplied to an inlet of a compressor of the gas turbine system and wherein the mass flow is added to the air flowing through the compressor.

15. The method of claim 14, wherein, collecting the condensate water comprises collecting water from the inlet air chilling system in a condensate recovery system, and supplying the condensate water comprises supplying the water from the condensate recovery system to the wet compression air fogging system.

16. The method of claim 15, further comprising collecting the condensate water from a component of the inlet air chilling system.

17. The method of claim 16, wherein the condensate water collects in a drain pan of the condensate recovery system.

18. The method of claim 16, wherein the condensate water is provided to adiabatic pads in an air cooled heat rejection device.

19. The method of claim 15, wherein supplying the water to the wet compression air fogging system comprises opening a flow control valve in the condensate recovery system and pumping the water from a first storage tank in the condensate recovery system to a second storage tank in the wet compression air fogging system.

20. The method of claim 15, further comprising sensing a dew point of the air.

21. The method of claim 20, further comprising sensing the dew point is rising and opening a flow control device in the condensate recovery system based on sensing the dew point of the air is rising, the flow control device supplying the condensate water to an external system.

22. The method of claim 21, wherein the external system is a cooling tower of the inlet air chilling system.

23. The method of claim 20, further comprising sensing the dew point is below a predetermined threshold and lowering a set point temperature of the air flowing from an outlet of the inlet air chilling system.

* * * * *